(12) United States Patent
Duan et al.

(10) Patent No.: US 11,792,835 B2
(45) Date of Patent: Oct. 17, 2023

(54) SYSTEMS AND METHODS FOR PROVIDING FEEDBACK FOR WIRELESS COMMUNICATION

(71) Applicant: Samsung Electronics Co., Ltd., Suwon-si (KR)

(72) Inventors: Ruchen Duan, Santa Clara, CA (US); Mostafa Sayed Roshdy Ibrahim, San Jose, CA (US); Wook Bong Lee, San Jose, CA (US); Srinivas Kandala, Morgan Hill, CA (US); Ashok Ranganath, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 166 days.

(21) Appl. No.: 17/120,049

(22) Filed: Dec. 11, 2020

(65) Prior Publication Data

US 2021/0219306 A1 Jul. 15, 2021

Related U.S. Application Data

(60) Provisional application No. 62/959,376, filed on Jan. 10, 2020.

(51) Int. Cl.
*H04L 5/00* (2006.01)
*H04W 72/542* (2023.01)
*H04W 72/21* (2023.01)

(52) U.S. Cl.
CPC ......... *H04W 72/542* (2023.01); *H04L 5/0055* (2013.01); *H04W 72/21* (2023.01)

(58) Field of Classification Search
CPC ........... H04W 72/085; H04W 72/0413; H04W 72/542; H04W 72/21; H04L 5/0055
See application file for complete search history.

(56) References Cited

U.S. PATENT DOCUMENTS

| 10,182,399 B1 * | 1/2019 | Chu | H04W 52/0229 |
| 10,237,014 B1 * | 3/2019 | Dabbagh | H04L 1/0015 |
| RE47,911 E * | 3/2020 | Soomro | H04W 52/383 |

(Continued)

FOREIGN PATENT DOCUMENTS

| EP | 2 645 648 A2 | 10/2013 |
| EP | 3 308 492 B1 | 4/2020 |

(Continued)

*Primary Examiner* — Michael J Moore, Jr.
(74) *Attorney, Agent, or Firm* — Lewis Roca Rothgerber Christie LLP

(57) ABSTRACT

Systems and methods for providing feedback regarding a wireless communication channel is disclosed. A responding processor is configured to estimate condition of the wireless communication channel and generate a data field. The data field includes a communication parameter based on the estimated condition of the wireless communication channel. The data field is attached to a control frame, and the control frame is transmitted with the attached data field. A transmitting processor is configured to receive the control frame, and determine whether the control frame includes the data field. The transmitting processor retrieves the data field from the control frame, and selects, based on the communication parameter in the data field, a transmit parameter for transmitting data over the wireless communication channel.

15 Claims, 8 Drawing Sheets

(56) References Cited

U.S. PATENT DOCUMENTS

| | | | | |
|---|---|---|---|---|
| 2003/0022686 A1* | 1/2003 | Soomro | ............... | H04L 1/0028 |
| | | | | 455/522 |
| 2006/0268886 A1* | 11/2006 | Sammour | ............ | H04W 28/18 |
| | | | | 370/394 |
| 2014/0023020 A1* | 1/2014 | Yang | .................... | H04L 1/1671 |
| | | | | 370/329 |
| 2016/0088602 A1* | 3/2016 | Seok | .................... | H04L 5/0055 |
| | | | | 370/338 |
| 2016/0119968 A1* | 4/2016 | Kim | .................... | H04L 1/1614 |
| | | | | 370/312 |
| 2017/0244530 A1* | 8/2017 | Cariou | ..................... | H04L 1/18 |
| 2017/0289844 A1* | 10/2017 | Son | ....................... | H04W 84/12 |
| 2019/0182010 A1* | 6/2019 | Dabbagh | ........... | H04W 74/0866 |
| 2021/0194629 A1* | 6/2021 | Shellhammer | ....... | H04B 7/0689 |
| 2021/0219306 A1* | 7/2021 | Duan | .................. | H04W 72/085 |
| 2021/0385006 A1* | 12/2021 | Ryu | ..................... | H04W 76/15 |

FOREIGN PATENT DOCUMENTS

| | | | | |
|---|---|---|---|---|
| WO | WO 2012/125821 A1 | | 9/2012 | |
| WO | WO-2012129909 A1 * | | 10/2012 | ........... H04L 1/0026 |

\* cited by examiner

SYSTEMS AND METHODS FOR PROVIDING FEEDBACK FOR WIRELESS COMMUNICATION

CROSS-REFERENCE TO RELATED APPLICATION(S)

The present application claims priority to and the benefit of U.S. Provisional Application No. 62/959,376, filed Jan. 10, 2020, entitled "LINK ADAPTATION FEEDBACK IN WIFI SYSTEM," the entire content of which is incorporated herein by reference.

FIELD

One or more aspects of embodiments according to the present disclosure relate to wireless networks, and more particularly, to adjusting a communication parameter in a wireless channel based on channel feedback information.

BACKGROUND

Wireless communication may be conducted via a communication channel of a wireless network. The condition for the communication channel may affect the quality of the communication. Accordingly, it is desirable adjust communication parameters in response to detected changes of the condition of the communication channel.

The above information disclosed in this Background section is only for enhancement of understanding of the background of the present disclosure, and therefore, it may contain information that does not form prior art.

SUMMARY

Embodiments of the present disclosure are directed to a method for providing feedback regarding a wireless communication channel. The method includes estimating condition of the wireless communication channel; generating a data field, wherein the data field includes a communication parameter based on the estimated condition of the wireless communication channel; attaching the data field to a control frame; and transmitting the control frame with the attached data field, wherein a transmit parameter for transmitting data over the wireless communication channel is selected based on the communication parameter in the data field.

According to one embodiment, the estimated condition includes channel quality information.

According to one embodiment, the communication parameter includes at least one of modulation and coding scheme information or a number of spatial streams.

According to one embodiment, the control frame includes a bit, wherein setting of the bit signals presence of the data field.

According to one embodiment, the bit is associated with a type field included in the control frame.

According to one embodiment, the bit is a reserved bit included in the control frame.

According to one embodiment, presence of the data field is signaled via a capability indicator.

According to one embodiment, the data field is inserted into a body portion of the control frame.

According to one embodiment, the control frame includes an acknowledgment frame transmitted in response to receipt of a message frame from a transmitting device.

According to one embodiment, the method for providing feedback regarding a wireless communication channel further includes monitoring for a criterion, wherein the data field is attached in response to detecting satisfaction of the criterion.

Embodiments of the present disclosure are also directed to an apparatus for providing feedback regarding a wireless communication channel. The apparatus includes a processor and a memory coupled to the processor. The memory stores computer instructions that, when executed by the processor, cause the processor to: estimate condition of the wireless communication channel; generate a data field, wherein the data field includes a communication parameter based on the estimated condition of the wireless communication channel; attach the data field to a control frame; and transmit the control frame with the attached data field, wherein a transmit parameter for transmitting data over the wireless communication channel is selected based on the communication parameter in the data field.

Embodiments of the present disclosure are also directed to a system for receiving and providing feedback regarding a wireless communication channel. The system includes a responding processor and a transmitting processor. The responding processor is configured to estimate condition of the wireless communication channel; generate a data field, wherein the data field includes a communication parameter based on the estimated condition of the wireless communication channel; attach the data field to a control frame; and transmit the control frame with the attached data field. The transmitting processor is configured to receive the control frame; determine whether the control frame includes the data field; retrieve the data field from the control frame; and select, based on the communication parameter in the data field, a transmit parameter for transmitting data over the wireless communication channel.

As a person of skill in the art should recognize, providing feedback associated with conditions of a communication channel in a data field that is attached to a control frame, allows the feedback to be more frequent that current art systems, allowing the selection of transmit parameters to be more accurate. Setting proper transmit parameters may help improve system throughput.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
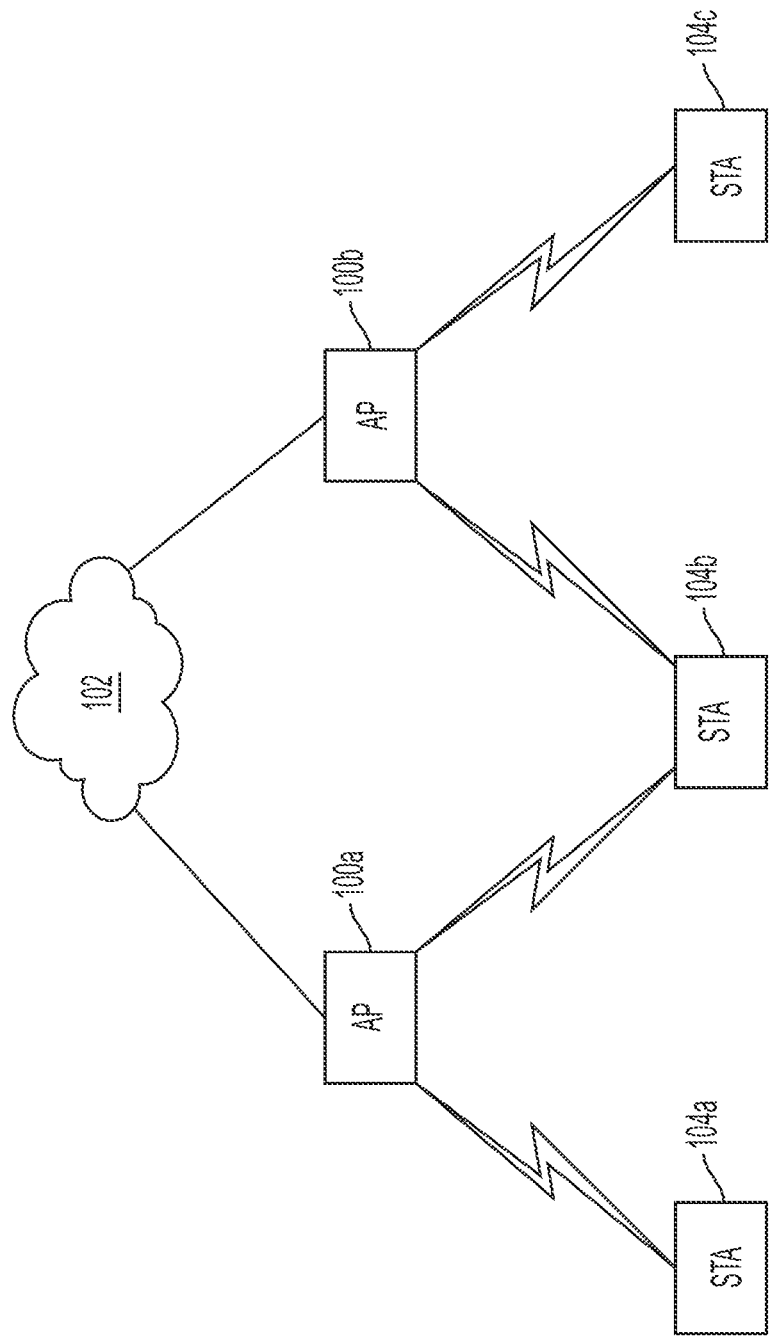
FIG. 1 is a schematic block diagram of a wireless network according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Wireless communication may be conducted over a communication channel of a wireless network, such as, for example, a wireless local area network (WLAN). For example, a wireless communication device may wirelessly communicate voice, video, data, and the like (collectively referred to as data) to another device, and vice versa. The condition of the communication channel, however, may affect the quality of the communication. Accordingly, it is desirable adjust communication parameters in response to changes in the condition of the communication channel in order to maximize, for example, data throughout.

In current art systems, information on the condition of the communication channel may be provided as an initial exchange of information prior to actual data frame exchange, as part of a sounding procedure. However, the estimated channel quality may degrade and change with time, so that accuracy of the initial estimate of the channel condition reduces as time progresses. Although some current art systems may allow updates on the condition of the channel via a link adaptation report, the link adaptation report is generally provided via a high throughput control (HTC) field. The providing the link adaptation report in an HTC field may create large overhead since, for example, all Medium Access Control (MAC) Protocol Data Units (MPDUs) that belong to the same Aggregate MPDU (A-MDPU) are configured to contain the same HTC field. The large overhead may cause the link adaptation data to be provided less frequently, if at all.

In general terms, embodiments of the present disclosure are directed to systems and methods for providing feedback associated with a communication channel (hereinafter referred to as link feedback). In one embodiment, the link feedback is provided in a link adaptation feedback field that is attached to a control frame. The control frame may be, for example, a block acknowledgment (ACK) frame that is transmitted by a recipient device to acknowledge proper receipt of a series of message data frames.

The presence of link feedback data may be signaled in one of various ways. For example, the control frame may include a type subfield that indicates a control frame type. A reserved type may be used in the type subfield to indicate presence of the feedback data. In some embodiments, a reserved bit in another field of the control frame may be set to indicate presence of the link feedback data. In some embodiments, a capability indicator during a link initialization phase may be employed for indicating presence of the link feedback data. A person of skill in the art should appreciate that by providing the feedback data with a control frame such as a block ACK frame, feedback on the condition of the communication channel may be provided in a more timely and accurate manner than present art systems, helping increase system throughput.

FIG. 1 is a schematic block diagram of a wireless network according to one embodiment. The wireless network includes access points 100*a*, 100*b* (collectively referenced as 100) configured to communicate with a data communications network 102, such as, for example, the Internet. The access points 100 may be, for example, a router, gateway, or any other network infrastructure configured to provide wireless access to the network 102.

In one embodiment, the access points provide wireless access to the network 102 to one or more stations 104*a*, 104*b*, 104*c* (collectively referenced as 104). The wireless access may be, for example, over a wireless local area network (WLAN). In this regard, a wireless communication standard such as, for example, Institute of Electrical and Electronics Engineers' (IEEE) 802.11 standard is employed by the access points 100 and the stations 104 for the wireless communication. The stations 104 may be, for example, mobile phones, laptops, desktops, printers, television sets, gaming stations, and/or other devices that contend for a wireless channel in the WLAN.

Figure 2:
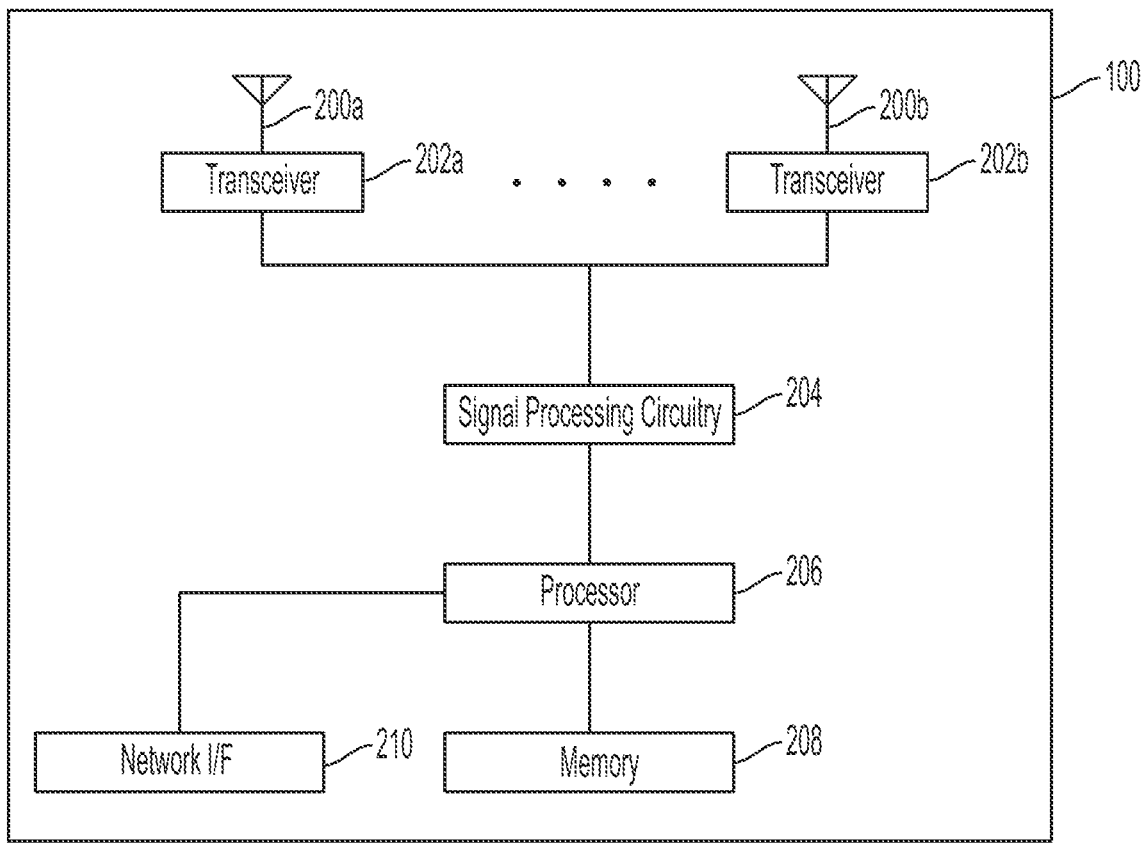
FIG. 2 is a more detailed block diagram of an access point of FIG. 1 according to one embodiment.

FIG. 2 is a more detailed block diagram of one of the access points 100 according to one embodiment. The access point 100 of FIG. 2 may include, without limitation, one or more antennas 200*a*-200*b* (collectively referenced as 200), one or more transceivers 202*a*-202*b* (collectively referenced as 202), signal processing circuitry 204, processor 206, and memory 208.

In one embodiment, the transceivers 202 receive from the antennas 200 incoming RF signals, such as signals transmitted by the stations 104. The transceivers 202 may be radio frequency (RF) transceivers configured to modulate the incoming RF signals received by the antennas 200. The transceivers may also be configured to demodulate outgoing signals to be transmitted to the stations 104 via the antennas 200.

In one embodiment, the signal processing circuity 204 is coupled to the transceivers 202 and the processor 206. The signal processing circuity 204 may include transmit circuitry and receive circuitry. The transmit circuity may be configured to receive analog or digital data from the processor 206, and generate corresponding outgoing signals for further processing by the transceivers 202. The receive circuitry may be configured to receive the demodulated signals from the transceivers 202, and generate corresponding data to be provided to the processor 206.

In one embodiment, the processor 206 includes one or more microprocessors, microcontrollers, and/or processing devices for controlling the overall operation of the access point 100. Such operation may include, for example, providing the stations 104 wireless access to the data communications network 102. In one embodiment, the processor 206 may be configured to engage in channel sounding procedures for understanding the channel conditions of the stations 104 to select proper transmit parameters for transmitting downlink data frames to the stations. The processor 206 may further be configured to transmit and/or receive link feedback data. When transmitting the link feedback data, the processor 206 may be configured to estimate current channel conditions (e.g. CQI of a channel) and provide recommended communication parameters to the stations 104 as link feedback data. When receiving the link feedback data from the stations 104, the processor 206 may be configured to adjust one or more transmit parameters based on the link feedback data. In this regard, the processor 206 may be configured to execute corresponding computer instructions stored in the memory 208. The memory may include a random access memory (RAM) and read-only memory (ROM). The processor 206 may be configured to move data into or out of the memory 208 when executing a process of the access point 100.

In one embodiment, the processor 206 is also coupled to a network interface 210. The network interface 210 may be any wired or wireless connection such as, for example, an Ethernet or RF transceiver. In one embodiment, the network interface 210 may allow the access point 100 to communicate over the data communications network 102.

Figure 3:
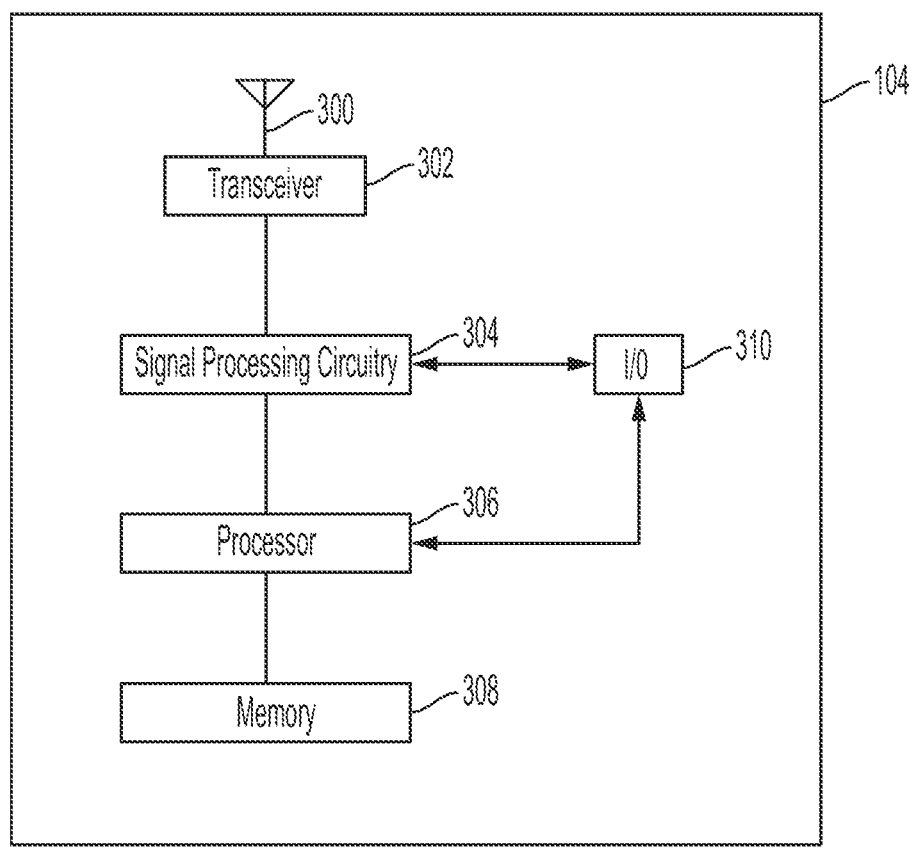
FIG. 3 is a more detailed block diagram of a station of FIG. 1 according to one embodiment.

FIG. 3 is a more detailed block diagram of one of the stations 104 according to one embodiment. The station 104 of FIG. 3 may include antenna(s) 300, a transceiver 302, signal processing circuitry 304, processor 306, memory 308, and one or more input/output (I/O) devices (e.g. microphone, speaker, display, and the like).

In one embodiment, the transceiver 302 receives from the antenna(s) 300 incoming RF signals, such as signals transmitted by one of the access points 100. The transceiver 302 may be a radio frequency (RF) transceiver configured to modulate the incoming RF signals received by the antenna (s) 300. The transceiver may also be configured to demodulate outgoing signals to be transmitted to the access point 100 via the antenna(s) 300.

In one embodiment, the signal processing circuity 304 is coupled to the transceiver 302 and the processor 306. The signal processing circuity 304 may include transmit circuity and receive circuitry. The transmit circuity may be configured to receive analog or digital voice data from one of the I/O devices (e.g a microphone), or other outgoing data from the processor 306, and generate corresponding outgoing signals for further processing by the transceiver 302. The receive circuitry may be configured to receive the demodulated signals from the transceiver 302, and generate corresponding data to be provided to the processor 306 or one of the I/O devices 310 (e.g. speaker).

In one embodiment, the processor 306 includes one or more microprocessors, microcontrollers, and/or processing devices for controlling the overall operation of the station 104. Such operation may include, for example, wirelessly communicating voice and other data to the access points 100 over wireless communication channels. In this regard, the processor 306 may be configured to execute computer instructions stored in the memory 308. The memory may include a random access memory (RAM) and read-only memory (ROM). The processor 306 may be configured to move data into and out of the memory 308 when executing a process of the station 104.

In one embodiment, the processor 306 is further configured to engage in channel sounding procedures. During a channel sounding procedure, the processor 306 may estimate the CQI of a wireless communication channel, and transmit information on the estimated condition to the access point 100 in a beamforming report.

In one embodiment, the processor is configured to transmit and/or receive link feedback data. When transmitting the link feedback data, the processor 306 may be configured to estimate current channel conditions (e.g. CQI of a channel) and provide recommended communication parameters to the access point 100 as link feedback data. When receiving the link feedback data from the access point 100, the processor 306 may be configured to adjust one or more transmit parameters based on the link feedback data.

Whether the link feedback data is provided by the station 104 or the access point 100, the data may be provided as a data field that is attached to a control frame. The control frame may be, for example, a block acknowledgment frame transmitted in response to receipt of one or more data frames. The link feedback data may be provided with each block acknowledgment frame, or not. For example, an algorithm may determine whether the link feedback data should be attached to a particular block acknowledgment frame. The algorithm may determine, for example, whether proper transmit parameters are being used or not. If the algorithm determines that proper transmit parameters have been used for the past X number of frames, link feedback data may not need to be provided until change of the communication channel condition is detected.

Figure 4:
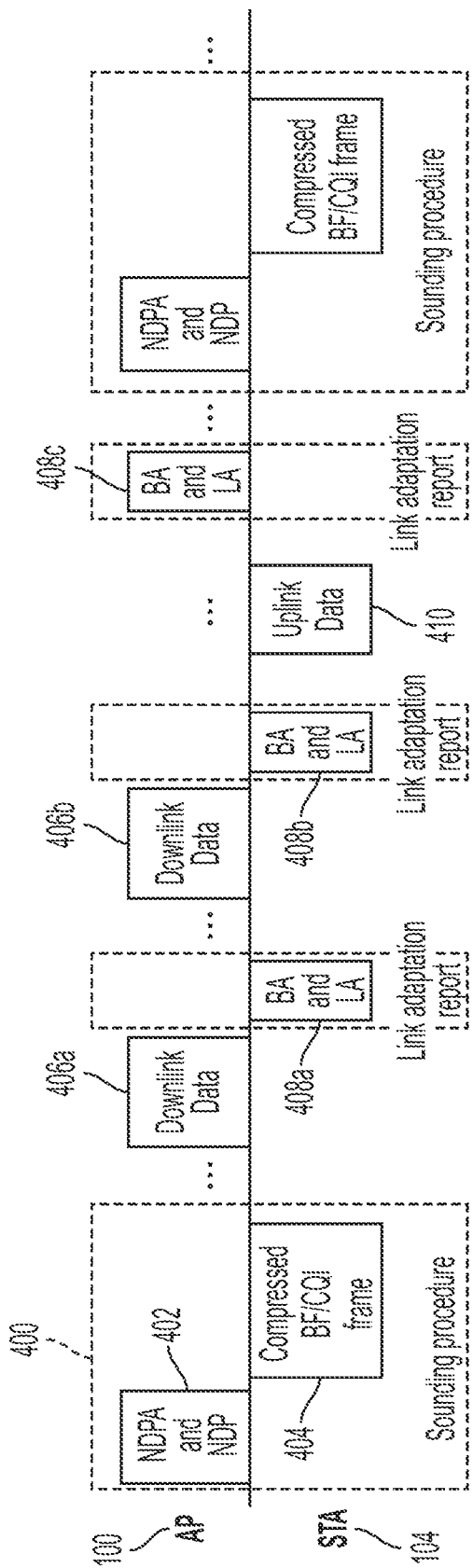
FIG. 4 is a schematic diagram of a signal flowchart for transmitting and receiving frames between an access point and a station according to one embodiment.

FIG. 4 is a schematic diagram of a signal flowchart for transmitting and receiving frames between an access point 100 and a station 104 according to one embodiment. Prior to exchange of actual data frames between the access point 100 and the station, initial frames are exchanged in a sounding procedure 400. The initial data frames may be null data packet announcement (NDPA) and null data packet (NDP) frames 402 as described in the IEEE 802.11 standard. In one embodiment, the initial frames 402 contain requirements for the station 104 in providing channel sounding feedback to the access point 100. In one embodiment, the station 104 evaluates conditions of the wireless channel (e.g. CQI) based on the received requirements, and provides the channel sounding feedback (including the CQI) in a compressed beamforming report 404. The access point 100 may use the channel sounding feedback to select proper transmit parameters, and transmit downlink data frames 406a, 406b (collectively referenced as 406) to the station 104 using the selected transmit parameters. The station 104 may also transmit uplink data frames 410 to the access point 100 over the wireless channel.

In one embodiment, block ACK frames 408a, 408b, 408c (collectively referenced as 408) are transmitted to acknowledge receipt of the downlink or uplink message frames 406, 410. For example, the station 104 may transmit block ACK frames 408a, 408b in response to proper receipt of the downlink message frames 406a, 406b. The access point 100 may transmit a block ACK frame 408c in response to proper receipt of the uplink message frames 408c.

In one embodiment, a portion of the block ACK frame is utilized to provide link feedback information. The link feedback information may be included in each block ACK frame, or in certain block ACK frames as determined by a selection algorithm. In one embodiment, the selection algorithm may determine whether a criterion has been satisfied. The link feedback information may be inserted into the block ACK frame in response to determining that the criterion has been satisfied. By inserting link feedback information into the block ACK frame, link feedback information may be provided in a more frequent and timely manner than current art systems.

Figure 5:
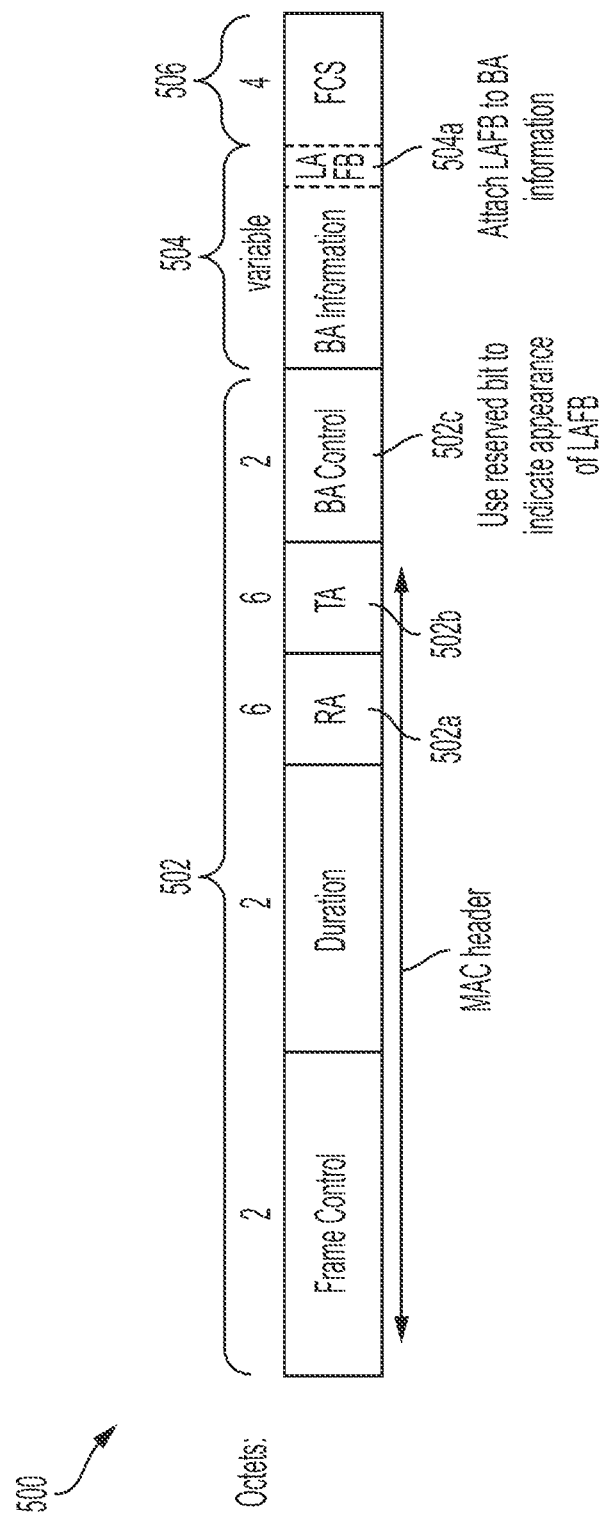
FIG. 5 is a conceptual layout diagram of a control frame according to one embodiment.

FIG. 5 is a conceptual layout diagram of a control frame 500 according to one embodiment. The control frame 500 may be similar to the block ACK frame 408 of FIG. 4. In one embodiment, the control frame adheres to the IEEE 802.11 standard. In this regard, the control frame 500 may include a header portion 502, body portion 504, and a trailer portion 506. The header portion may include one or more header fields, such as, for example, a receiver address field 502a, transmitter address field 502b, and control identification (ID) field 502c. Each field in the header portion may be of a preset size.

In one embodiment, the control ID field 502c in the header portion 502 includes one or more bits. Different bits of the control ID field may be set to identify a different type of control frame. In one embodiment, a reserved/unused bit in the control ID field is used to indicate presence of link feedback data within the control frame 500. In this regard, the reserved bit in the control ID field may be set (e.g. set to 1) when link feedback data is present. The reserved bit may remain unset (e.g. remain 0) when link feedback data is not present.

Although the control ID field 502c is used as an example of a field that may be used to indicate presence of link feedback data, in some embodiments, other fields of the control frame may be used for making such indication. For example, a different reserved bit in a different field of the control frame 500 may be used to indicate presence of the link feedback data.

In one embodiment, link feedback data is attached/inserted in the body portion 504 of the control frame 500. In one embodiment, a field 504a is generated for transmitting the link feedback data, and the field is included as information to be transmitted in the body portion of the control frame. The link feedback field 504a may be attached to other information that may be typically transmitted in the body of the control frame. In one embodiment, the link feedback field 504a may be deemed to be a sub-field of the control frame 500.

The trailer portion 506 of the control frame 500 may contain a frame check sequence (FCS) that is used to validate that the contents of the entire frame 500 have not been tampered with or have become corrupted during transmission over the wireless channel. The FCS may be generated based on the values in the header portion 502 and the body portion 504 (including the link feedback field 504a), and included into the trailer portion 506 prior to transmittal of the frame. A transmitting device that receives the control frame 500 may process the received header portion 502 and the body portion 504, and compare the results of the processing to the FCS in the trailer portion 506. The device receiving the control frame 500 may disregard the frame 500 if the FCS in the trailer portion 506 does not match the generated results.

In some embodiments, other types subfields/fields, such as an operation parameters field conveyed in management frames and operating mode (OM) control subfield conveyed in control frames, as described in the IEEE 802.11 standard, may be used for indicating presence of the link adaptation field 504a in the control frame 500. For example, an operation parameters field may be conveyed in a management frame that is used to transmit capabilities of the wireless network during initialization of the wireless channel between the access point 100 and the station 104. After the link initialization stage, the station 104 may use the OM control subfield conveyed in the control frames to show that link adaptation feedback will be or will not be present in the following frames.

Figure 6:
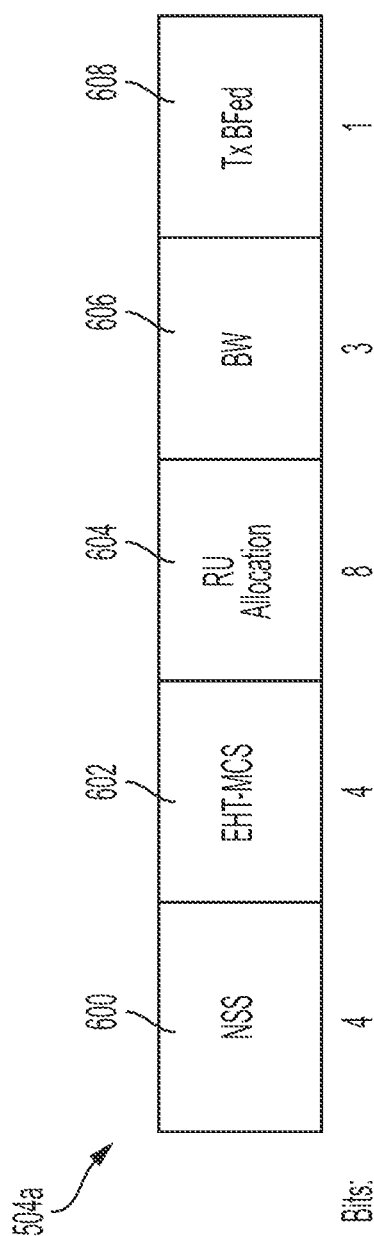
FIG. 6 is a conceptual layout diagram of a link adaptation frame that may be attached to the control frame of FIG. 5, according to one embodiment.

FIG. 6 is a conceptual layout diagram of the link adaptation field 504a according to one embodiment. The link adaptation field 504a may include one or more fields that may be used to store different aspects of the link feedback data. For example, one or more communication parameters may be stored based on determining an estimate of a current channel condition. The communication parameters may include, without limitation, one or more recommended transmit parameters such as, for example, a number of spatial streams (NSS) 600, modulation and coding scheme (MCS) value 602, resource unit allocation information 604, bandwidth 606, transmit beamformed bit 608, and/or the like. In some embodiments, signal-to-noise information is also provided as a communication parameter in the link adaption field 504a. The communication parameters may then be used by the transmitting entity (e.g. the access point 100 or station 104) that receives the link adaptation field 504a, for adjusting one or more transmit parameters.

Figure 7:
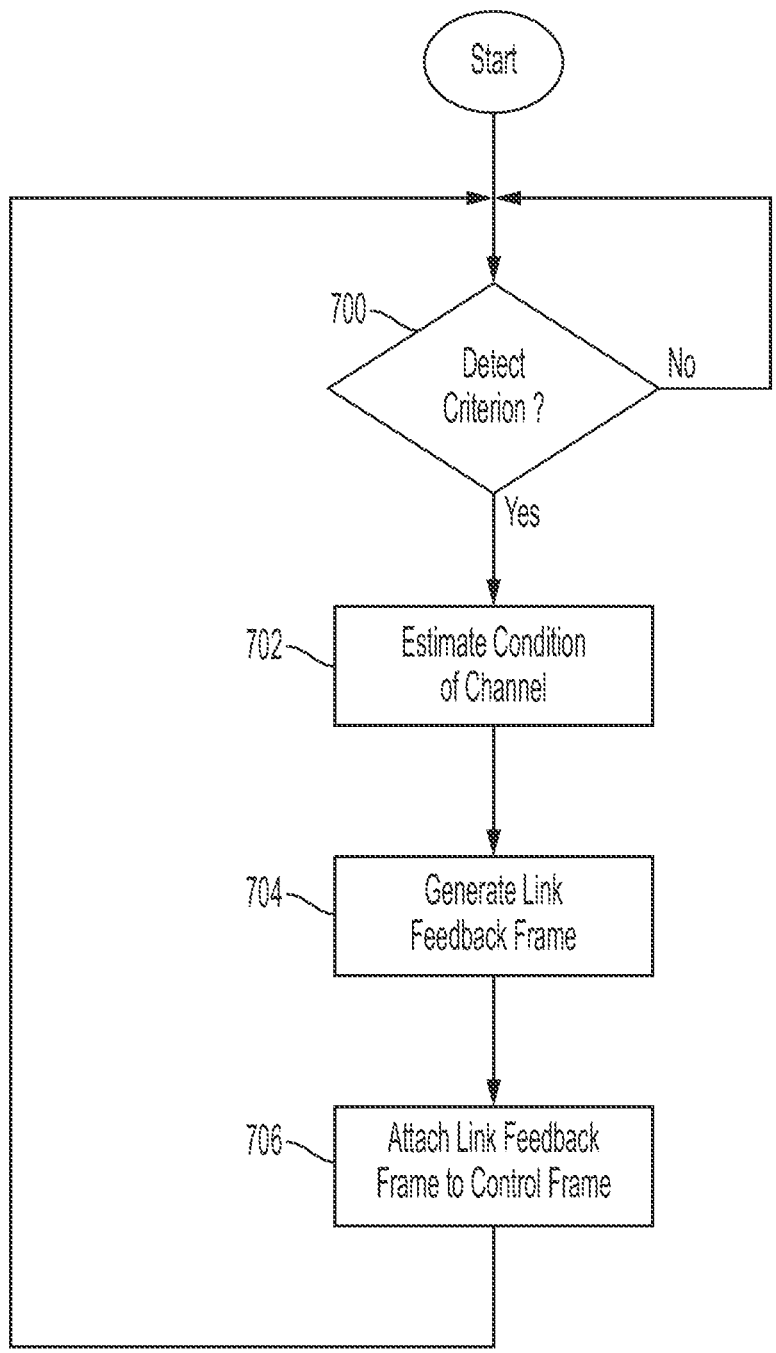
FIG. 7 is a flow diagram of a process for providing link feedback data to a transmitting device according to one embodiment.

FIG. 7 is a flow diagram of a process for providing link feedback data to a transmitting device according to one embodiment. The process may be executed by a responding processor (e.g. the processor 206, 306 of the access point 100 or station 104). It should be understood that the sequence of steps of the process is not fixed, but can be modified, changed in order, performed differently, performed sequentially, concurrently, or simultaneously, or altered into any desired sequence, as recognized by a person of skill in the art.

The process starts, and at block 700, the responding processor monitors for a criterion for estimating quality of the wireless channel, and for transmitting link feedback data. In doing so, the responding processor may be configured to execute instructions that are stored in the memory 208, 308. In one embodiment, the responding processor executes an algorithm that monitors for a criterion, and determines whether the criterion has been satisfied. The criterion may be whether to transmit a control frame. In the embodiment where the control frame is a block ACK frame, the criterion may be satisfied upon receipt of one or more correctly transmitted data frames (e.g. downlink or uplink data frames 406, 410). Receipt of such frames may trigger the transmitting of the block ACK frame, and in some embodiments, automatically trigger the estimating of channel quality information, and transmitting link feedback data.

In some embodiments, link feedback data is not automatically transmitted with each control frame. In some embodiments, the algorithm examines other factors for determining whether the quality of the channel is to be estimated to generate and transmit link feedback data. For example, the algorithm may determine whether the transmitting device has been using proper transmit parameters in prior transmissions using the channel. Whether proper transmit parameters have been used may depend on the packet error rate in the previous received packet, the received signal power, interference power for each subcarrier, and/or each part of channel bandwidth. If the algorithm determines, within a threshold level of confidence, that the transmitting device has been using proper transmit parameters, the algorithm may determine that the criterion for sending link feedback data has not been satisfied.

If, however, the criterion is deemed to be satisfied, at block 700, the responding processor estimates a condition of the wireless channel. This may include, for example, estimating the CQI for one or more resource units and a number of spatial streams (NSS). The number of spatial streams used to estimate the CQI may be smaller than a previous NSS in a previous transmission. In one embodiment CQI, may be estimated using information in an extremely high throughput (EHT) Long Training field (EHT-LTF) of a reference signal.

At block 704, the receiving processor generates a link feedback field based on the estimated condition of the wireless channel. In this regard, the receiving processor may determine parameters such as a recommended NSS, EHT-MCS, RU allocation, bandwidth, and the like. The one or more parameters may be inserted in one or more sub-fields of the link feedback field.

In block 706, the receiving processor sets a bit (e.g. in the control ID field 502c) of the control frame 500, for indicating presence of the link feedback field. The receiving processor may further attach/insert the link feedback field 504a into the body portion 504 of the control frame. The processor may provide the control frame 500 to the signal processing circuitry 204, 304 for generating an output signal. The output signal may be demodulated by the transceiver 202, 302, and transmitted via the antenna 200, 300.

Figure 8:
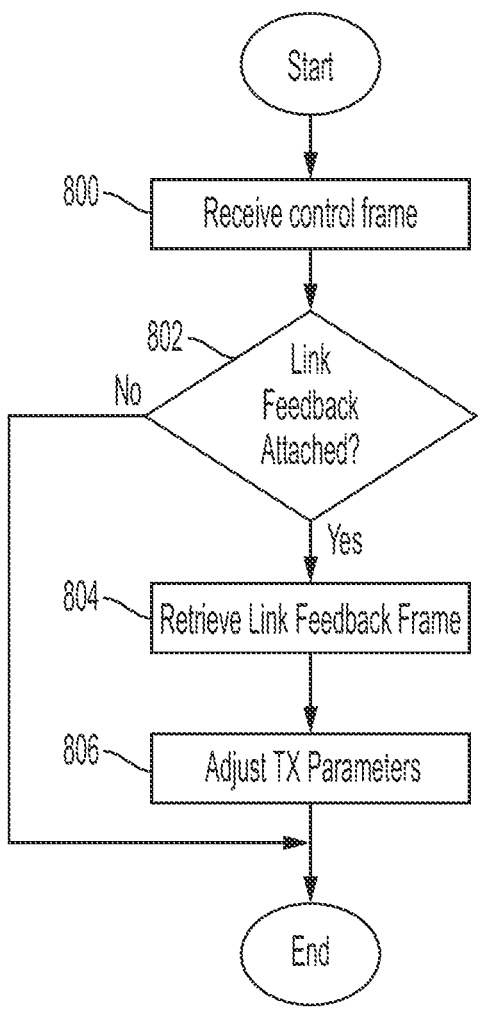
FIG. 8 is a flow diagram of a process executed by a transmitting processor in response to receiving link feedback data according to one embodiment.

FIG. 8 is a flow diagram of a process executed by a transmitting processor in response to receiving link feedback data according to one embodiment. The transmitting processor may be the processor 206 of the access point 100 in embodiments where the link adaptation feedback data is provided by the station 104, or the processor 306 of the station 104 in embodiments where the link adaptation feedback data is provided by the access point 100. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and at block 800, the transmitting processor receives the control frame 500, and at block 802, examines the received control frame for determining whether link feedback data is attached to the frame. For example, the transmitting processor may be configured to examine a preset field (e.g. a control ID field 502c) of the control frame 500 to determine whether the field has a bit set that indicates presence of the link feedback data.

If the answer is YES, the attached link feedback field 504a is retrieved, at block 804, from the body portion 504 of the control frame 500. In one embodiment, the values in one or more fields of the link feedback field 504a may be used as recommended values for setting one or more transmit parameters.

At block 806, the transmitting processor adjusts one or more transmit parameters based on the link feedback field 504a. For example, the transmitting processor may adjust a modulation and coding scheme (MCS) and/or a number of spatial streams (NSS) based on the feedback. For example, an MCS value stored in the link feedback field may be used to determine a modulation type and a coding rate for transmitting data. The adjusting of the transmit parameters may help increase throughput of the system.

In some embodiments, the term processor may refer to one or more processors and/or one or more processing cores. A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for providing feedback for wireless communication have been specifically described and illustrated herein, many modifications and variations will be apparent to those skilled in the art. Accordingly, it is to be understood that a system and method for providing feedback for wireless communication constructed according to principles of this disclosure may be embodied other than as specifically described herein. The disclosure is also defined in the following claims, and equivalents thereof.

What is claimed is:

1. A method for providing feedback regarding a wireless communication channel, the method comprising:
   estimating, by a responding processor, condition of the wireless communication channel;
   generating, by the responding processor, a data field, wherein the data field includes a communication parameter based on the estimated condition of the wireless communication channel;
   monitoring, by the responding processor, for a criterion;
   in response to detecting, by the responding processor, satisfaction of the criterion, attaching the data field to a control frame having a header portion and a body portion, wherein the data field is attached to the body portion of the control frame;
   setting, by the responding processor, a value in the header portion for indicating presence of the data field in the body portion; and
   transmitting, by the responding processor, the control frame with the data field, wherein a transmitting processor receives the data field in the control frame and selects a transmit parameter for transmitting data over the wireless communication channel based on the communication parameter in the data field.

2. The method of claim 1, wherein the estimated condition includes channel quality information.

3. The method of claim 1, wherein the communication parameter includes at least one of modulation and coding scheme information or a number of spatial streams.

4. The method of claim 1, wherein the header portion of the control frame includes a bit, wherein setting of the bit signals presence of the data field.

5. The method of claim 4, wherein the bit is associated with a type field included in the control frame.

6. The method of claim 4, wherein the bit is a reserved bit included in the control frame.

7. The method of claim 1, wherein presence of the data field is signaled via a capability indicator.

8. The method of claim 1, wherein the control frame includes an acknowledgment frame transmitted in response to receipt of a message frame from a transmitting device.

9. An apparatus for providing feedback regarding a wireless communication channel, the apparatus comprising:
   a processor; and
   a memory coupled to the processor, the memory storing computer instructions that, when executed by the processor, cause the processor to:
   estimate condition of the wireless communication channel;
   generate a data field, wherein the data field includes a communication parameter based on the estimated condition of the wireless communication channel;
   monitor for a criterion;
   in response to detecting satisfaction of the criterion, attach the data field to a control frame having a header portion and a body portion, wherein the data field is attached to the body portion of the control frame;
   set a value in the header portion for indicating presence of the data field in the body portion; and
   transmit the control frame with the data field, wherein a transmitting processor receives the data field in the control frame and selects a transmit parameter for transmitting data over the wireless communication channel based on the communication parameter in the data field.

10. The apparatus of claim 9, wherein the header portion of the control frame includes a bit, wherein setting of the bit signals presence of the data field.

11. The apparatus of claim 10, wherein the bit is associated with a type field included in the control frame.

12. The apparatus of claim 9, wherein the control frame includes an acknowledgment frame transmitted in response to receipt of a message frame from a transmitting device.

13. A system for receiving and providing feedback regarding a wireless communication channel, the system comprising:
   a responding processor configured to:
   estimate condition of the wireless communication channel;
   generate a data field, wherein the data field includes a communication parameter based on the estimated condition of the wireless communication channel;
   monitor for a criterion
   in response to detecting, by the responding processor, satisfaction of the criterion, attach the data field to a control frame having a header portion and a body portion, wherein the data field is attached to the body portion of the control frame;
   set a value in the header portion for indicating presence of the data field in the body portion; and
   transmit the control frame with the data field; and
   a transmitting processor configured to:
   receive the control frame;
   determine whether the control frame includes the data field based on the value in the header portion;
   retrieve the data field from the control frame; and
   select, based on the communication parameter in the data field, a transmit parameter for transmitting data over the wireless communication channel.

14. The system of claim 13, wherein the header portion of the control frame includes a bit, wherein setting of the bit signals presence of the data field.

15. The system of claim 13, wherein the control frame includes an acknowledgment frame transmitted in response to receipt of a message frame from a transmitting device.

* * * * *